United States Patent
Hong et al.

(10) Patent No.: US 11,830,678 B2
(45) Date of Patent: Nov. 28, 2023

(54) CERAMIC ELECTRONIC COMPONENT

(71) Applicant: SAMSUNG ELECTRO-MECHANICS CO., LTD., Suwon-si (KR)

(72) Inventors: Ji Su Hong, Suwon-si (KR); Seung In Baik, Suwon-si (KR); Eun Ha Jang, Suwon-si (KR); Hee Sun Chun, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 121 days.

(21) Appl. No.: 17/506,125

(22) Filed: Oct. 20, 2021

(65) Prior Publication Data

US 2022/0230810 A1    Jul. 21, 2022

(30) Foreign Application Priority Data

Jan. 21, 2021    (KR) .......................... 10-2021-0008811

(51) Int. Cl.
*H01G 4/30*    (2006.01)
*H01G 4/12*    (2006.01)
*H01G 4/012*   (2006.01)

(52) U.S. Cl.
CPC ............. *H01G 4/30* (2013.01); *H01G 4/012* (2013.01); *H01G 4/1218* (2013.01); *H01G 4/1281* (2013.01)

(58) Field of Classification Search
CPC ........ H01G 4/30; H01G 4/012; H01G 4/1218; H01G 4/1281; H01G 4/1227; H01G 4/2325; H01G 4/008
See application file for complete search history.

(56) References Cited

U.S. PATENT DOCUMENTS

| | | | |
|---|---|---|---|
| 2007/0142209 A1* | 6/2007 | Ito | B32B 18/00 501/137 |
| 2009/0059471 A1* | 3/2009 | Fukuda | C04B 35/4682 264/615 |
| 2012/0162858 A1* | 6/2012 | Tanaka | H01G 4/30 361/321.4 |
| 2015/0187498 A1* | 7/2015 | Uchida | H01G 4/1227 361/301.4 |
| 2017/0018358 A1* | 1/2017 | Isota | H01G 4/30 |
| 2017/0186548 A1 | 6/2017 | Sato et al. | |
| 2019/0135701 A1* | 5/2019 | Yun | C04B 35/49 |
| 2019/0148042 A1* | 5/2019 | Yun | H01G 4/1281 361/275.3 |
| 2020/0258684 A1* | 8/2020 | Yun | H01G 4/228 |
| 2020/0270179 A1* | 8/2020 | Yoshida | C04B 41/5045 |

FOREIGN PATENT DOCUMENTS

| | | |
|---|---|---|
| JP | 2017-120854 A | 7/2017 |
| KR | 10-2019-0053480 A | 5/2019 |

* cited by examiner

*Primary Examiner* — Michael P McFadden
(74) *Attorney, Agent, or Firm* — Morgan, Lewis & Bockius LLP

(57) ABSTRACT

A ceramic electronic component includes a body including a dielectric layer and internal electrodes; and external electrodes disposed on the body and connected to the internal electrodes. The dielectric layer includes a plurality of grains and a grain boundary disposed between adjacent grains, and GB1/G1 is 5 or more in mass ratio, where G1 is a content of Si of one of the plurality of grains and GB1 is a content of Si of the grain boundary.

19 Claims, 8 Drawing Sheets

CERAMIC ELECTRONIC COMPONENT

CROSS-REFERENCE TO RELATED APPLICATION

This application claims benefit of priority to Korean Patent Application No. 10-2021-0008811 filed on Jan. 21, 2021 in the Korean Intellectual Property Office, the disclosure of which is incorporated herein by reference in its entirety.

TECHNICAL FIELD

The present disclosure relates to a ceramic electronic component.

BACKGROUND

A multilayer ceramic capacitor (MLCC), a ceramic electronic component, is a chip-type condenser mounted on the printed circuit boards of various types of electronic products such as display devices including liquid crystal displays (LCDs) and plasma display panels (PDPs), computers, smartphones, cell phones, and the like to allow electricity to be charged therein and discharged therefrom.

Such an MLCC having advantages such as compactness, guaranteed high capacitance, and ease in mounting thereof may be used as a component of various electronic devices. As various electronic devices such as computers, mobile devices, and the like, have become smaller and higher in terms of power output, demand for miniaturization and higher capacitance in multilayer ceramic capacitors has increased.

In order to achieve miniaturization and high capacitance of a multilayer ceramic capacitor, it is necessary to increase the number of layers thereof by reducing a thickness of a dielectric layer and an internal electrode. Currently, the thickness of the dielectric layer has reached a level of about 0.6 μm and thinning layers is in progress. However, as the thickness of the dielectric layer decreases, reliability decreases and characteristics such as insulation resistance, breakdown voltage, etc. are lowered.

In particular, demand for temperature stability of a multilayer ceramic capacitor has increased according to high performance of an application processor (AP) for processing a large amount of data.

SUMMARY

An aspect of the present disclosure may provide a ceramic electronic component having excellent reliability.

An aspect of the present disclosure may also provide a ceramic electronic component having excellent high temperature reliability.

According to an aspect of the present disclosure, a ceramic electronic component includes: a body including a dielectric layer and internal electrodes; and external electrodes disposed on the body and connected to the internal electrodes. The dielectric layer includes a plurality of grains and a grain boundary disposed between adjacent grains, and GB1/G1 is 5 or more in mass ratio, where G1 is a content of Si of one of the plurality of grains and GB1 is a content of Si of the grain boundary.

According to an aspect of the present disclosure, a ceramic electronic component includes: a body including a dielectric layer and internal electrodes; and external electrodes disposed on the body and connected to the internal electrodes. The dielectric layer, including $BaTiO_3$ as a main component and Dy and Si as subcomponents, includes a plurality of grains and a grain boundary disposed between adjacent grains. GB2/GB1 is 1.5 or more and 2.3 or less in mass ratio, in which GB1 is a content of Si of the grain boundary and GB2 is a Dy content of the grain boundary.

According to an aspect of the present disclosure, a ceramic electronic component includes: a body including a dielectric layer and internal electrodes; and external electrodes disposed on the body and connected to the internal electrodes. The dielectric layer, including $BaTiO_3$ as a main component and Mn and Si as subcomponents, includes a plurality of grains and a grain boundary disposed between adjacent grains. GB3/GB1 is 0.2 or more and 0.5 or less in mass ratio, in which GB1 is a content of Si of the grain boundary and GB3 is an Mn content of the grain boundary.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
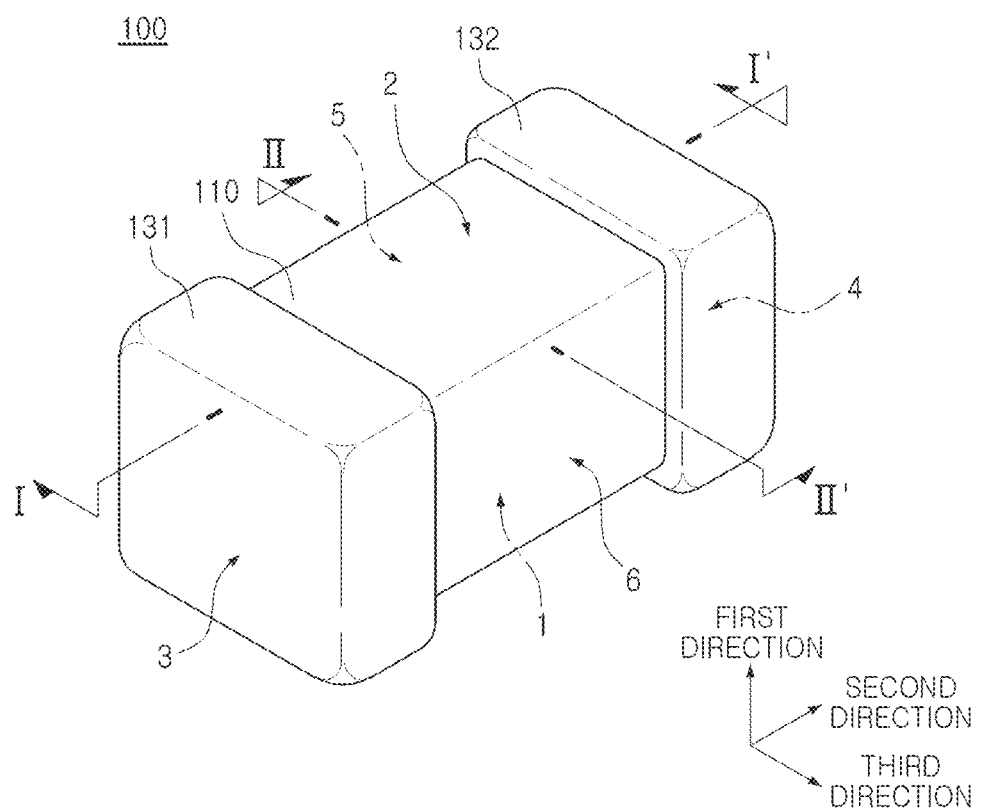
FIG. 1 is a schematic perspective view of a ceramic electronic component according to an exemplary embodiment in the present disclosure.

Exemplary embodiments of the present disclosure will now be described in detail with reference to the accompanying drawings.

In the drawings, a first direction may be defined as a stacking direction or a thickness (T) direction, a second direction may be defined as a length (L) direction, and a third direction may be defined as a width (W) direction.

Ceramic Electronic Component

FIG. 1 is a schematic perspective view of a ceramic electronic component according to an exemplary embodiment in the present disclosure.

Figure 2:
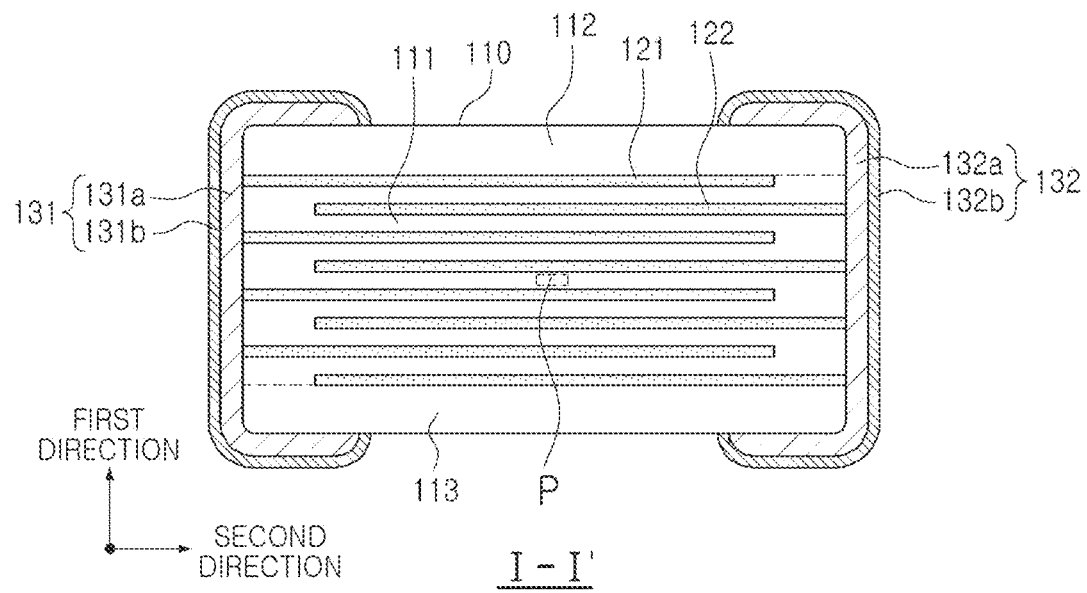
FIG. 2 is a cross-sectional view taken along line I-I' of FIG. 1.

FIG. 2 is a cross-sectional view taken along line I-I' of FIG. 1.

Figure 3:
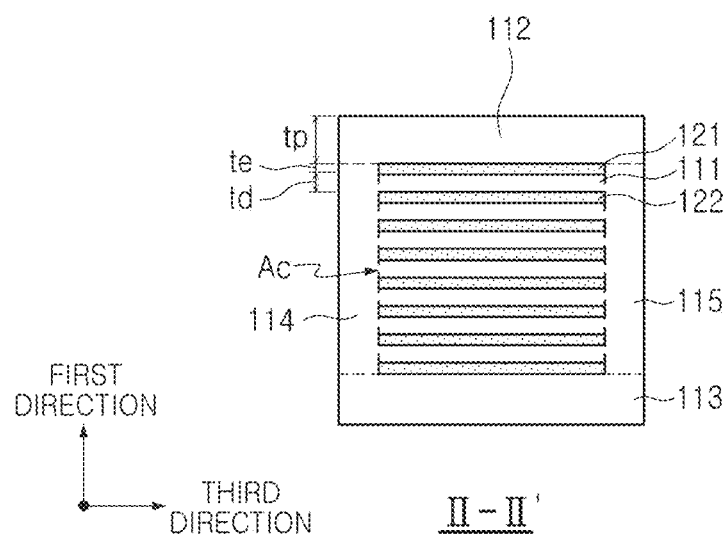
FIG. 3 is a cross-sectional view taken along line II-II' of FIG. 1.

FIG. 3 is a cross-sectional view taken along line II-II' of FIG. 1.

Figure 4:
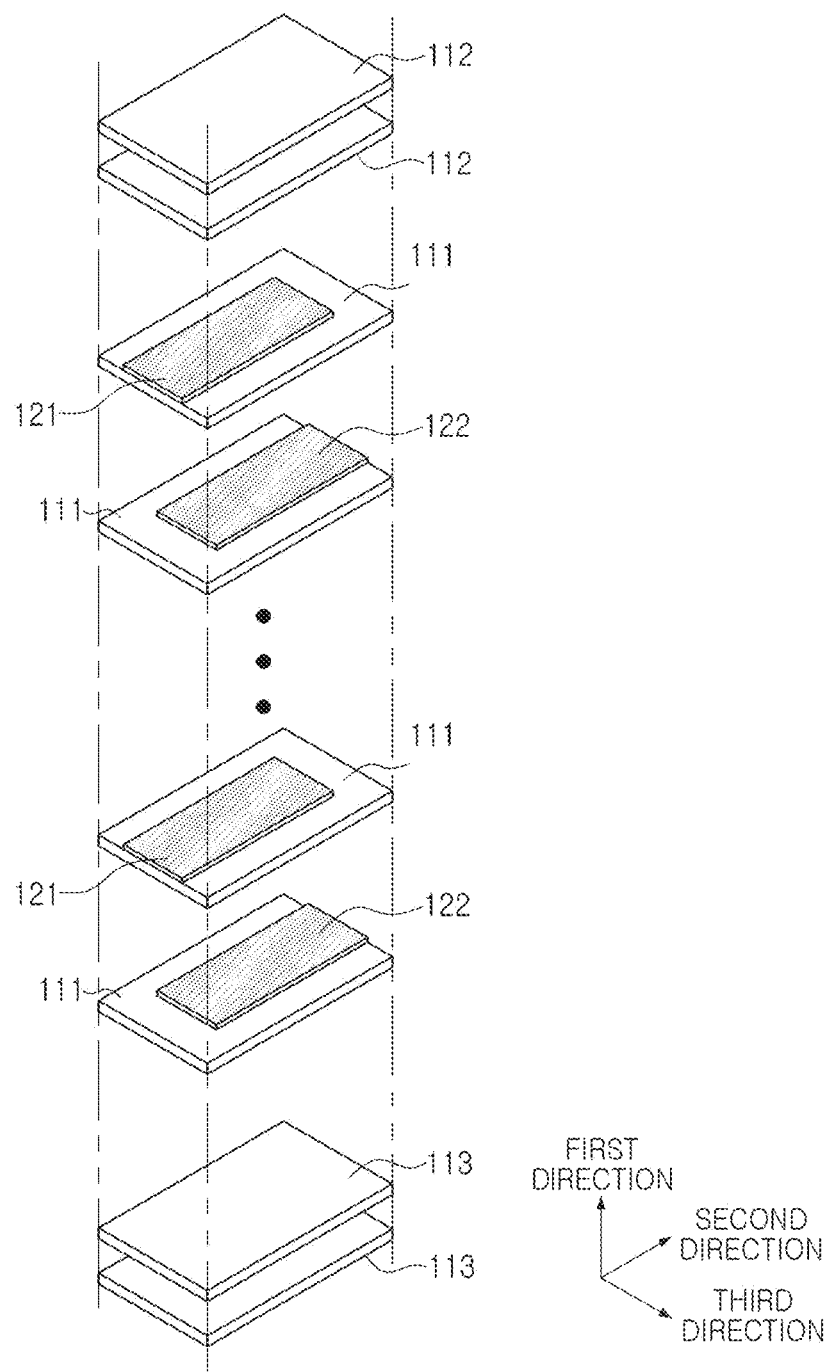
FIG. 4 is an exploded perspective view schematically illustrating a body of a ceramic electronic component according to an exemplary embodiment in the present disclosure.

FIG. 4 is an exploded perspective view schematically illustrating a body of a ceramic electronic component according to an exemplary embodiment in the present disclosure.

Figure 5:
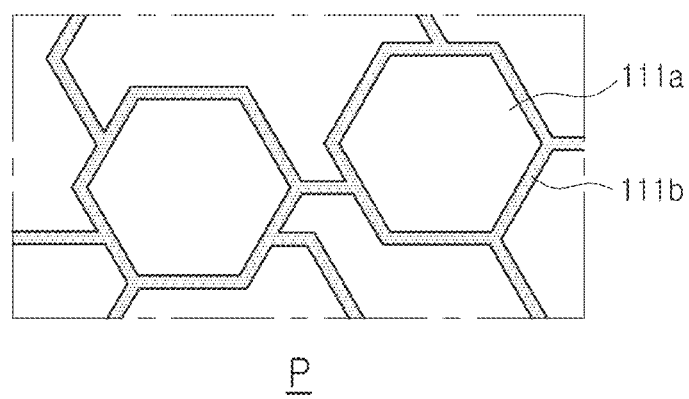
FIG. 5 is an enlarged view of region P of FIG. 2.

FIG. 5 is an enlarged view of region P of FIG. 2.

Hereinafter, a ceramic electronic component 100 according to an exemplary embodiment in the present disclosure will be described in detail with reference to FIGS. 1 through 6. In addition, a multilayer ceramic capacitor is described as an example of a ceramic electronic component, but the present disclosure is not limited thereto and may be applied to various ceramic electronic components using a ceramic material, for example, an inductor, a piezoelectric element, a varistor, or a thermistor.

The ceramic electronic component 100 according to an exemplary embodiment in the present disclosure may include a body 110 including a dielectric layer 111 and internal electrodes 121 and 122; and external electrodes 131 and 132 disposed on the body 110 and connected to the internal electrodes 121 and 122. The dielectric layer 111 includes a plurality of grains 111a and grain boundaries 111b disposed between adjacent grains, and GB1/G1 may be 5 or more in mass ratio, where G1 is the content of Si of the grains and GB1 is the content of Si of the grain boundaries.

In the body 110, the dielectric layer 111 and the internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a sintering process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

The dielectric layer 111 includes a plurality of grains 111a and grain boundaries 111b disposed between adjacent grains, and when the content of Si of the grains is G1 and the content of Si of the grain boundaries is GB1, GB1/G1 is 5 or more in mass ratio.

A multilayer ceramic capacitor (MLCC), which is one of ceramic electronic components, tends to have high capacitance and to be thinned. In order to realize thinning of the dielectric layer, a technology of suppressing basic charge transfer by basically reducing a size of dielectric grains and increasing grain boundary resistance of dielectric grains is required.

According to an exemplary embodiment in the present disclosure, reliability may be improved by controlling a distribution of the Si element having a high work function in the grains 111a and grain boundaries 111b. Specifically, reliability may be improved by increasing an energy level of the grain boundaries by controlling a ratio (GB1/G1) of the Si content in the grain boundaries to the Si content in the grains to 5 or more in mass ratio.

Here, an upper limit of GB1/G1 may not be particularly limited and, for example, GB1/G1 may be less than 6.5.

Meanwhile, a method of controlling GB1/G1 may not be particularly limited, and, for example, an element distribution of grain boundaries and a thickness of grain boundaries may be controlled by controlling a reducing atmosphere during sintering.

The dielectric layer 111 may include $BaTiO_3$ as a main component and dysprosium (Dy), manganese (Mn), and silicon (Si) as subcomponents.

When Dy is added to barium titanate ($BaTiO_3$) as a main component, it replaces Ba-site to perform a donor role, thereby reducing a concentration of oxygen vacancies and improving reliability.

Mn, as an element having a variable electron value (multi-valence), may serve to lower a sintering temperature and improve high-temperature withstand voltage characteristics. In addition, when added to barium titanate ($BaTiO_3$), Mn may substitute Ti-site.

Since Si has a high work function, Si, when distributed in the grain boundaries, may increase an energy level of the grain boundaries to improve reliability. In addition, when Si is added to barium titanate ($BaTiO_3$), a main component, Si may substitute Ti-site.

Meanwhile, the subcomponent may further include Ni.

In an exemplary embodiment, an average thickness of the grain boundaries 111b may be 1.1 nm or more.

If the average thickness of the grain boundaries 111b is less than 1.1 nm, the effect of improving reliability according to the GB1/G1 control may be insufficient.

Here, an upper limit of the average thickness of the grain boundaries 111b may not be particularly limited. For example, the average thickness of the grain boundaries may be less than 3.0 nm.

In an exemplary embodiment, the Si content (G1) included in the grains may be 0.4 wt % or less, and the Si content (GB1) included in the grain boundaries may be 1.6 wt % or more. Here, G1 is a value based on the grains, and GB1 is a value based on the grain boundaries. That is, a mass ratio of Si in the grains is 0.4 wt % or less, and a mass ratio of Si in the grain boundaries is 1.6 wt % or more.

If G1 is greater than 0.4 wt % or GB1 is less than 1.6 wt %, a difference in energy levels between the grains and grain boundaries may be small and the effect of improving reliability may be insufficient.

In an exemplary embodiment, when the Dy content of the grain boundaries is GB2, GB2/GB1 may be 2.3 or less in mass ratio.

If GB2/GB1 exceeds 2.3, reliability may deteriorate due to an increase in charge density of the grain boundaries.

Here, a lower limit of GB2/GB1 may not be particularly limited and, for example, GB2/GB1 may be 1.5 or more.

In an exemplary embodiment, when the Mn content of the grain boundaries is GB3, GB3/GB1 may be 0.5 or less in mass ratio.

If GB3/GB1 exceeds 0.5, reliability may decrease due to an increase in charge density of the grain boundaries.

Here, a lower limit of GB3/GB1 may not be particularly limited and, for example, GB3/GB1 may be 0.2 or more.

According to the present disclosure, an energy level of the grain boundaries may be increased by increasing the Si distribution in the grain boundaries by controlling GB1/G1, and the withstand voltage characteristics of the grain boundaries may be improved by reducing a distribution of donors and acceptors in the grain boundaries by controlling GB2/GB1 and/or GB3/GB1, whereby high temperature reliability characteristics may be improved.

Meanwhile, a thickness td of the dielectric layer 111 may not be limited.

However, in general, if the dielectric layer is formed to be thin to have a thickness less than 0.6 µm, in particular, if the thickness of the dielectric layer is 0.45 µm or less, reliability may be degraded.

As described above, according to an exemplary embodiment in the present disclosure, since reliability is improved by increasing the energy level of the grain boundaries by controlling the ratio (GB1/G1) of the Si content included in the grain boundaries to the Si content included in the grains to 5 or more in mass ratio, excellent reliability may be ensured even when the thickness of the dielectric layer 111 is 0.5 µm or less.

Therefore, when the thickness of the dielectric layer 111 is 0.45 µm or less, the effect of improving reliability according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured by scanning an image of a length-thickness (L-T) direction cross-section of the body 110 with a scanning electron microscope (SEM).

For example, regarding a certain dielectric layer extracted from an image of the first and second direction (length-thickness direction) cross-section taken in a central portion of the body 110 in the third direction (width direction) with the SEM, thicknesses thereof may be measured at 30 points at equal intervals in the length direction, and an average value thereof may be calculated.

The thicknesses measured at 30 equally spaced points may be measured at a capacitance forming portion Ac which refers to a region in which the first and second internal electrodes 121 and 122 overlap each other.

The body 110 may include the capacitance forming portion Ac formed inside the body 110 and forming capacitance with the first internal electrode 121 and the second internal electrode 122 disposed to face each other with the dielectric layer 111 interposed therebetween and cover portions 112 and 113 formed above and below the capacitance forming portion Ac in the first direction.

Other methods and/or tools appreciated by one of ordinary skill in the art, even if not described in the present disclosure, may also be used.

In addition, the capacitance forming portion Ac is a part that contributes to formation of capacitance of the capacitor, which may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 may not be limited. However, a thickness tp of the cover portions 112 and 113 may be 20 µm or less in order to more easily achieve miniaturization and high capacitance in the ceramic electronic component.

In addition, margin portions 114 and 115 may be disposed on side surfaces of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both side surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (first-third) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the width direction.

The internal electrodes 121 and 122 are alternately stacked with the dielectric layer 111.

The internal electrodes 121 and 122 may include first and second internal electrodes 121 and 122. The first and second internal electrodes 121 and 122 may be alternately disposed to face each other with a dielectric layer 111 configuring the body 110 interposed therebetween and may be exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen-printing method or a gravure printing method, but the present disclosure is not limited thereto.

Meanwhile, the thickness to of the internal electrodes 121 and 122 may not be particularly limited.

However, in general, if the internal electrodes are formed to be thin to have a thickness less than 0.6 µm, in particular, if the thickness of the internal electrodes is 0.5 µm or less, reliability may be lowered.

As described above, according to an exemplary embodiment in the present disclosure, since reliability may be improved by increasing an energy level of the grain boundaries by controlling the ratio (GB1/G1) of the Si content included in the grain boundaries to the Si content included in the grains to 5 or more in mass ratio, excellent reliability may be ensured even when the thickness of the internal electrodes 121 and 122 is 0.50 µm or less.

Therefore, when the thickness of the internal electrodes 121 and 122 is 0.50 µm or less, the effect according to the present disclosure may be more remarkable and miniaturization and high capacitance of the ceramic electronic component may be more easily achieved.

The thickness to of the internal electrodes 121 and 122 may refer to an average thickness of the internal electrodes 121 and 122.

The average thickness of the internal electrodes 121 and 122 may be measured by scanning an image of a length and thickness direction (L-T) cross-section of the body 110 with an SEM.

For example, in an image obtained by scanning a cross-section of the body 110 in the first and second directions (length and thickness directions) taken in a central portion of the body 110 in the third direction (width direction), certain first and second internal electrodes 121 and 122 may be extracted, and thicknesses thereof at 30 points at equal intervals in the length direction may be measured, and an average value of the measured thicknesses may be calculated.

The 30 equally spaced points may be measured in the capacitance forming portion Ac, which refers to a region in which the internal electrodes 121 and 122 overlap each other.

The external electrodes 131 and 132 are disposed on the third and fourth surfaces 3 and 4 of the body 110.

The external electrodes 131 and 132 may include first and second external electrodes 131 and 132 disposed on the third and fourth surfaces 3 and 4 of the body 110 and connected to the first and second internal electrodes 121 and 122, respectively.

Referring to FIG. 1, the external electrodes 131 and 132 may be disposed to cover both end surfaces of side margin portions 114 and 115 in the second direction.

In this exemplary embodiment, a structure in which the ceramic electronic component 100 has two external electrodes 131 and 132 is described, but the number or shape of the external electrodes 131 and 132 may be modified according to shapes of the internal electrodes 121 and 122 or other purposes.

Meanwhile, the external electrodes 131 and 132 may be formed of any material as long as the material has electrical conductivity such as a metal, and a specific material may be determined in consideration of electrical characteristics and structural stability, and further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

For a more specific example of the electrode layers 131a and 132a, the electrode layers 131a and 132a may be fired electrodes including a conductive metal and glass or resin-based electrodes including a conductive metal and a resin.

In addition, the electrode layers 131a and 132a may have a form in which a sintered electrode and a resin-based electrode are sequentially formed on the body. In addition, the electrode layers 131a and 132a may be formed by transferring a sheet including a conductive metal onto the body or by transferring a sheet including a conductive metal onto the sintered electrode.

A material having excellent electrical conductivity may be used as the conductive metal included in the electrode layers 131a and 132a, and the material is not particularly limited. For example, the conductive metal may be one or more of nickel (Ni), copper (Cu), and alloys thereof.

The plating layers 131b and 132b serve to improve mounting characteristics. The plating layers 131b and 132b are not limited in type and may be plating layers including at least one of Ni, Sn, Pd, and alloys thereof or may be formed of a plurality of layers.

For a more specific example of the plating layers 131b and 132b, the plating layers 131b and 132b may include a Ni plating layer or an Sn plating layer, and in this case, the Ni plating layer and the Sn plating layer may be sequentially formed on the electrode layers 131a and 132a or the Sn plating layer, the Ni plating layer, and the Sn plating layer may be sequentially formed on the electrode layers 131a and 132a. In addition, the plating layers 131b and 132b may include a plurality of Ni plating layers and/or a plurality of Sn plating layers.

A size of the ceramic electronic component 100 may not be particularly limited.

However, in order to achieve both miniaturization and high capacitance, the number of layers needs to be increased by reducing the thickness of the dielectric layer and the internal electrode, and thus, the effect of improving reliability and insulation resistance according to the present exemplary embodiment may be remarkable in a ceramic electronic component 100 having a 1005 size (length×width, 1.0 mm×0.5 mm) or less.

Accordingly, when the length of the ceramic electronic component 100 is 1.1 mm or less and the width thereof is 0.55 mm or less, taking into account a manufacturing error and a size of the external electrodes, the effect of improving reliability according to the present disclosure may be more remarkable. Here, the length of the ceramic electronic component 100 refers to a size of the ceramic electronic component 100 in the second direction, and the width of the ceramic electronic component 100 refers to a size of the ceramic electronic component 100 in the third direction.

Exemplary Embodiment

In an exemplary embodiment in the present disclosure, a dielectric composition containing barium titanate ($BaTiO_3$) as a main component and containing Dy, Si, and Mn as subcomponents was prepared, and a proto-type MLCC in which a dielectric layer was formed by controlling grain boundaries by adjusting a reducing atmosphere during sintering using a ceramic green sheet including the dielectric composition was prepared.

For Test Nos. 1 to 3, prototype MLCC samples completed as described above, a thickness of grain boundaries and element contents of grains and the grain boundaries were measured and described in Table 1 below, and high temperature IR degradation was measured and described in Table 1 below.

The thickness of the grain boundaries was measured as a full width at half maximum (FWHM) of the Si content by line-profiling a range of 10 nm passing a boundary between grains vertically. Here, the FWHM refers to a width of a distribution corresponding to ½ of a maximum value in a curve representing a mountain-shaped distribution. The measurement may be performed, for example, by a transmission electron microscope (TEM). Other methods and/or tools appreciated by one of ordinary skill in the art, even if not described in the present disclosure, may also be used.

The Si, Dy and Mn contents of the grain boundaries (GB1, GB2, and GB3) were measured average values of Si, Dy, and Mn included in the grain boundaries in the line profile, and the Si, Dy and Mn contents of the grains (G1, G2, and G3) were measured average values of Si, Dy and Mn included in the grain boundaries in the line profile.

As for the high temperature IR degradation, 40 sample chips per Test No. were prepared, and a voltage corresponding to 1.5 times a rated voltage was applied to the sample chips for 72 hours at 105° C. Sample chips whose insulation resistance was lowered to less than 1 kΩ were determined as defective chips, and a percentage of the chips determined to be defective are described.

TABLE 1

| Test No. | 1* | 2* | 3 |
|---|---|---|---|
| Thickness of grain boundary | 0.78 nm | 0.90 nm | 1.23 nm |
| Si content of grain boundary (GB1) | 1.15 wt % | 1.50 wt % | 1.65 wt % |
| Si content of grain (G1) | 0.60 wt % | 0.50 wt % | 0.30 wt % |
| GB1/G1 | 1.92 | 3.00 | 5.50 |
| Dy content of grain boundary (GB2) | 3.48 wt % | 3.65 wt % | 3.50 wt % |
| Dy content of grain (G2) | 1.96 wt % | 1.80 wt % | 1.50 wt % |
| GB2/G2 | 1.78 | 2.03 | 2.33 |
| Mn content of grain boundary (GB3) | 0.63 wt % | 1.30 wt % | 0.60 wt % |
| Mn content of grain (G1) | 0.35 wt % | 0.50 wt % | 0.40 wt % |
| GB3/G3 | 1.79 | 2.60 | 1.50 |
| GB2/GB1 | 3.02 | 2.43 | 2.12 |
| G2/G1 | 3.26 | 3.60 | 5.00 |
| GB3/GB1 | 0.54 | 0.87 | 0.36 |
| G3/G1 | 0.58 | 1.00 | 1.33 |
| High temperature IR degradation | 100% | 100% | 22.5% |

Test Nos. 1 and 2 had GB1/G1 less than 5, inferior in high temperature reliability. Meanwhile, it can be seen that Test No. 3 had GB1/G1 of 5 or more, excellent in high temperature reliability.

In addition, it can be seen that, in the case of Test Nos. 1 and 2, insulation resistance after evaluation of high temperature IR degradation was reduced to about 1/10000 compared to initial values, and in the case of Test No. 3, insulation resistance after evaluation of high temperature IR degradation was reduced to about 1/1000 compared to an initial value, having excellent high temperature reliability.

In addition, it can be seen that a thickness of the grain boundary increases as the GB1/G1 value increases, and a thickness of the grain of Test No. 3 is 1.1 nm or more.

In addition, it can be seen that the Dy/Si content ratio (GB2/GB1) at the grain boundary and the Mn/Si content ratio (GB3/GB1) at the grain boundary decrease as the GB1/G1 value increases, and it can be seen that GB2/GB1 of Test No. 3 is 2.3 or less and GB3/GB1 of Test No. 3 is 0.5 or less.

Figure 6:
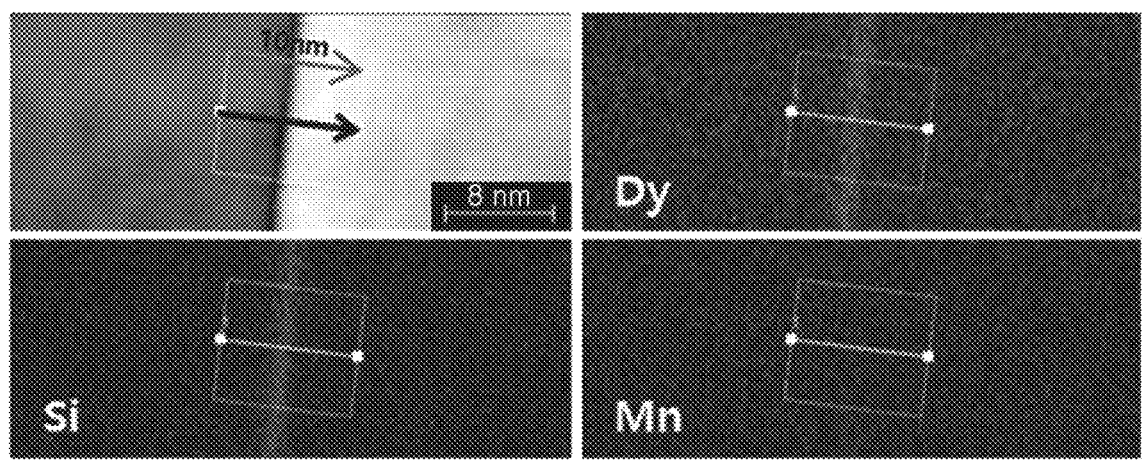
FIG. 6 is an image of a dielectric layer of Test No. 3 scanned with a transmission electron microscope (TEM) and mapped images of Dy, Si, and Mn.
Figure 7A:
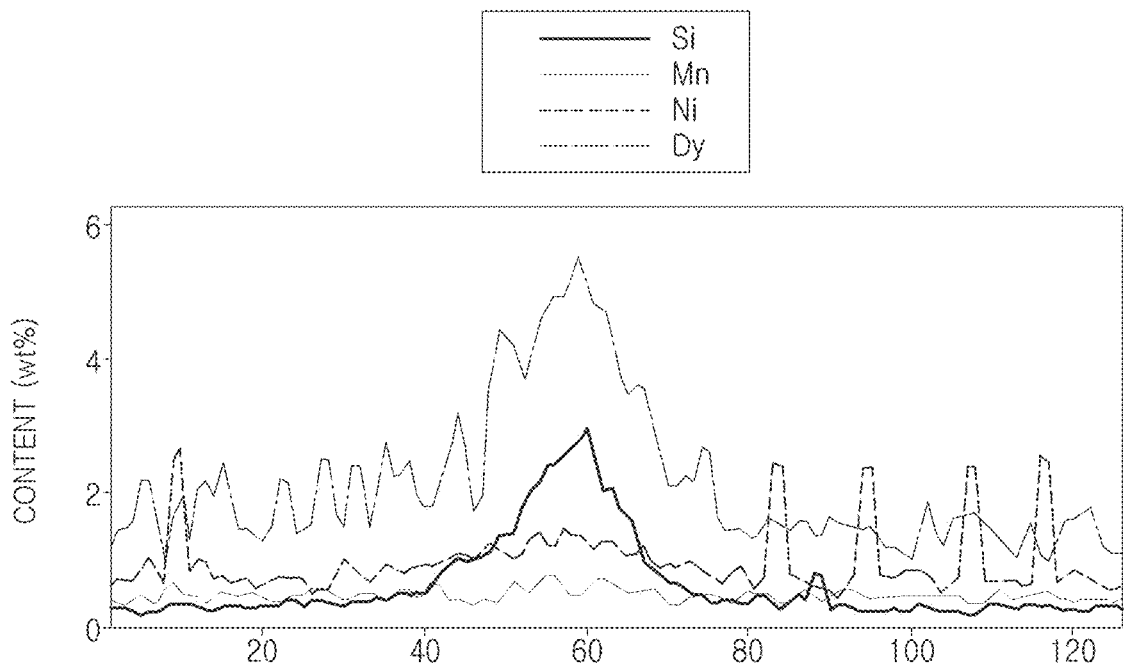
FIGS. 7A and 7B are results of performing line analysis along the arrow of FIG. 6.
Figure 7B:
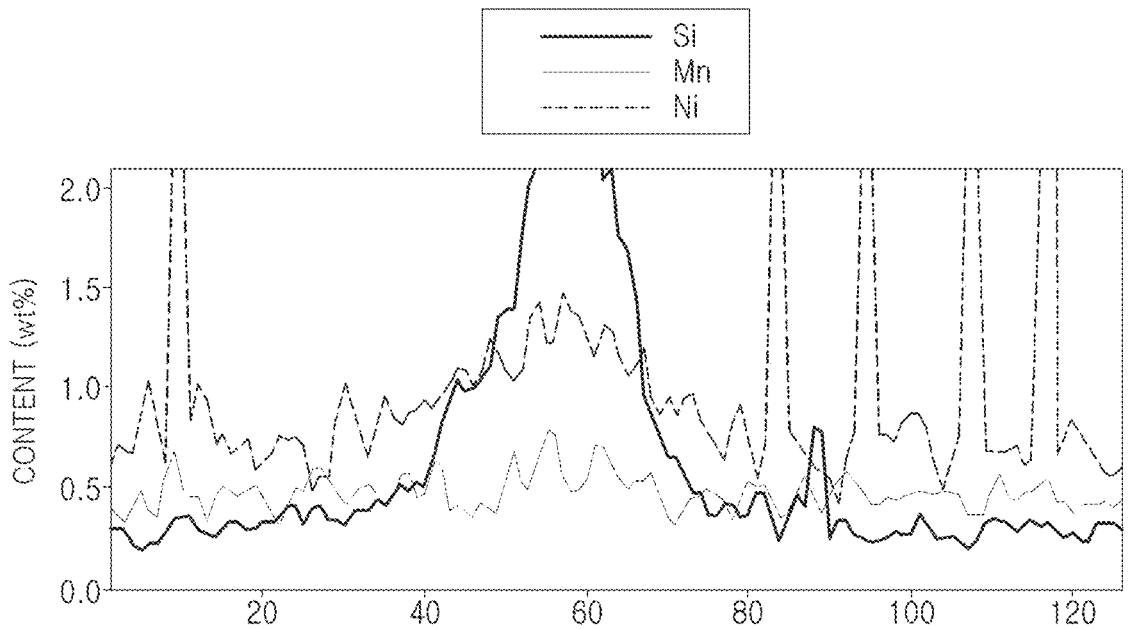

FIG. 6 is an image of a dielectric layer of Test No. 3 scanned with a transmission electron microscope (TEM) and mapped images of Dy, Si, and Mn. FIGS. 7A and 7B are results of performing line analysis along the arrow of FIG. 6. FIG. 7B is an enlarged view of a portion of 0 wt % to 2.0 wt % in FIG. 7A.

Figure 8:
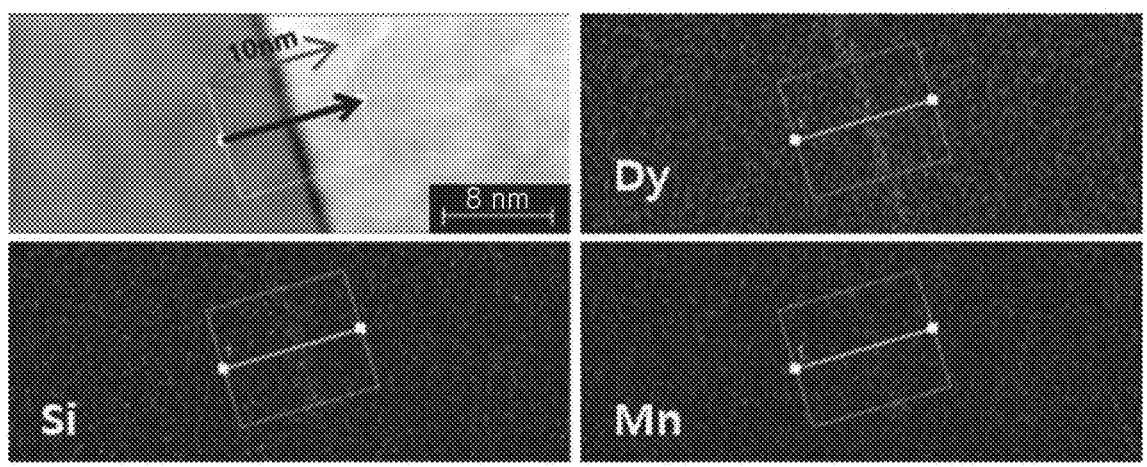
FIG. 8 is an image of a dielectric layer of Test No. 1 scanned with a TEM and mapped images of Dy, Si, and Mn.
Figure 9A:
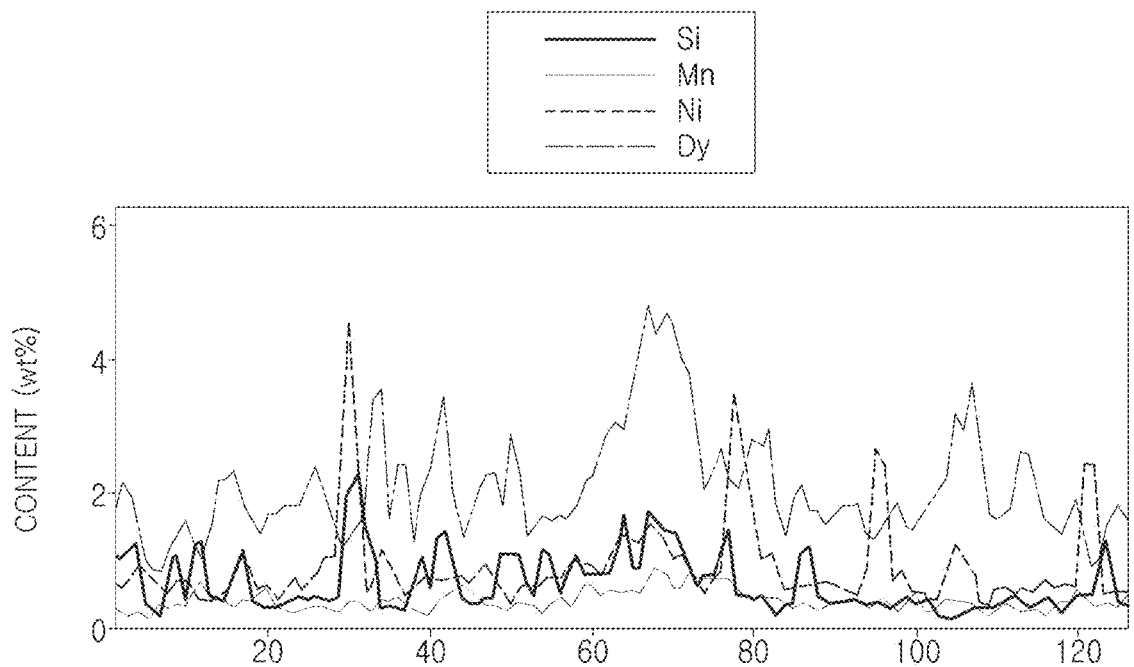
FIGS. 9A and 9B are results of performing line analysis along the arrow of FIG. 8.
Figure 9B:
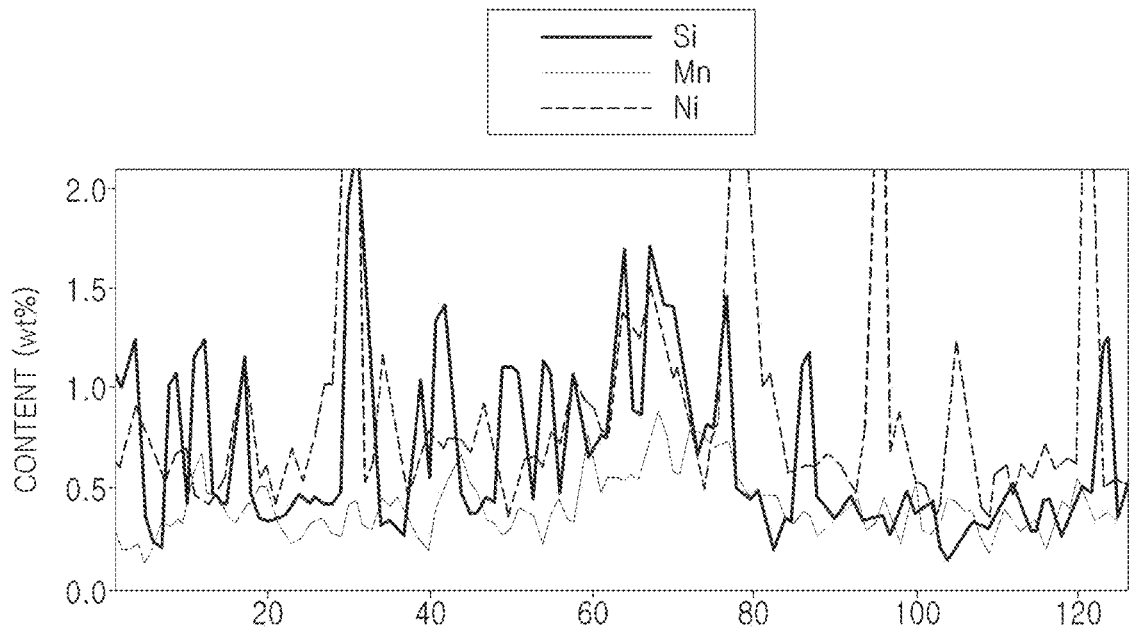

FIG. 8 is an image of a dielectric layer of Test No. 1 scanned with a TEM and mapped images of Dy, Si, and Mn. FIGS. 9A and 9B are results of performing line analysis along the arrow of FIG. 8. FIG. 9B is an enlarged view of a portion of 0 wt % to 2.0 wt % in FIG. 9A.

In the case of Test No. 1, the thickness of the grain boundary is small, Dy is mainly distributed at the grain boundary, and only a very small amount of Mn, Si, etc. is distributed at the grain boundary. In such a structure, it is difficult to secure excellent reliability because a high energy level of the grain boundary cannot be secured.

In the case of Test No. 3, the thickness of the grain boundary is sufficiently large at 1.23 nm, since a distribution of Si at the grain boundary is high, an energy level of the grain boundary is high and GB2/GB1 and GB3/GB1 are low, and a distribution of donors and acceptors in the grain boundary is small, thereby securing excellent high temperature reliability characteristics.

As set forth above, according to exemplary embodiments of the present disclosure, reliability of the dielectric composition and the ceramic electronic component including the same may be improved.

While exemplary embodiments have been shown and described above, it will be apparent to those skilled in the art that modifications and variations could be made without departing from the scope of the present disclosure as defined by the appended claims.

What is claimed is:

1. A ceramic electronic component comprising:
a body including a dielectric layer and internal electrodes; and
external electrodes disposed on the body and connected to the internal electrodes,
wherein the dielectric layer includes a plurality of grains and a grain boundary disposed between adjacent grains, and GB1/G1 is 5 or more in mass ratio, where G1 is a content of Si of one of the plurality of grains and GB1 is a content of Si of the grain boundary.

2. The ceramic electronic component of claim 1, wherein the dielectric layer includes $BaTiO_3$ as a main component and Dy, Mn, and Si as subcomponents.

3. The ceramic electronic component of claim 2, wherein GB2/GB1 is 2.3 or less in mass ratio in which GB2 is a Dy content of the grain boundary.

4. The ceramic electronic component of claim 3, wherein GB2/GB1 is 1.5 or more and 2.3 or less in mass ratio.

5. The ceramic electronic component of claim 2, wherein GB3/GB1 is 0.5 or less in mass ratio in which GB3 is an Mn content of the grain boundary.

6. The ceramic electronic component of claim 5, wherein GB3/GB1 is 0.2 or more and 0.5 or less in mass ratio.

7. The ceramic electronic component of claim 5, wherein GB2/GB1 is 2.3 or less in mass ratio in which GB2 is a Dy content of the grain boundary.

8. The ceramic electronic component of claim 1, wherein an average thickness of the grain boundary is 1.1 nm or more.

9. The ceramic electronic component of claim 1, wherein an average thickness of the grain boundary is less than 3.0 nm.

10. The ceramic electronic component of claim 1, wherein an average thickness of the grain boundary is 1.1 nm or more and less than 3.0 nm.

11. The ceramic electronic component of claim 1, wherein GB1/G1 is 5 or more and less than 6.5 in mass ratio.

12. The ceramic electronic component of claim 1, wherein G1 is 0.4 wt % or less with respect to the one of the plurality of grains, and GB1 is 1.6 wt % or more with respect to the grain boundary.

13. A ceramic electronic component comprising:
a body including a dielectric layer and internal electrodes; and
external electrodes disposed on the body and connected to the internal electrodes,
wherein the dielectric layer, including $BaTiO_3$ as a main component and Dy and Si as subcomponents, includes a plurality of grains and a grain boundary disposed between adjacent grains, and
GB2/GB1 is 1.93 or more and 2.3 or less in mass ratio, in which GB1 is a content of Si of the grain boundary and GB2 is a Dy content of the grain boundary.

14. The ceramic electronic component of claim 13, wherein an average thickness of the grain boundary is 1.1 nm or more and less than 3.0 nm.

15. The ceramic electronic component of claim 13, wherein G1, a content of Si of one of the plurality of grains, is 0.4 wt % or less with respect to the one of the plurality of grains, and
GB1 is 1.6 wt % or more with respect to the grain boundary.

16. The ceramic electronic component of claim 13, wherein the dielectric layer further includes Mn as a subcomponent, and
GB3/GB1 is 0.2 or more and 0.5 or less in mass ratio, in which GB3 is an Mn content of the grain boundary.

17. A ceramic electronic component comprising:
a body including a dielectric layer and internal electrodes; and
external electrodes disposed on the body and connected to the internal electrodes,
wherein the dielectric layer, including $BaTiO_3$ as a main component and Mn and Si as subcomponents, includes a plurality of grains and a grain boundary disposed between adjacent grains, and
GB3/GB1 is 0.2 or more and 0.5 or less in mass ratio, in which GB1 is a content of Si of the grain boundary and GB3 is an Mn content of the grain boundary.

18. The ceramic electronic component of claim 17, wherein an average thickness of the grain boundary is 1.1 nm or more and less than 3.0 nm.

19. The ceramic electronic component of claim 17, wherein G1, a content of Si of one of the plurality of grains, is 0.4 wt % or less with respect to the one of the plurality of grains, and
GB1 is 1.6 wt % or more with respect to the grain boundary.

* * * * *